US011271718B2

(12) United States Patent
Bessonov et al.

(10) Patent No.: US 11,271,718 B2
(45) Date of Patent: Mar. 8, 2022

(54) SYSTEMS AND METHODS FOR LINKING ANONYMIZED USER ACTIVITIES WHILE PRESERVING STRONG PRIVACY GUARANTEES

(71) Applicant: BITCLAVE PTE. LTD., Trivex OT (SG)

(72) Inventors: Alexander Bessonov, San Jose, CA (US); Patrick Tague, Mountain View, CA (US); Mark Shwartzman, Campbell, CA (US); Stephen Winston, San Jose, CA (US); Vadim Gore, Beaverton, OR (US)

(73) Assignee: Bitclave Pte. Ltd., Trivex (SG)

( * ) Notice: Subject to any disclaimer, the term of this patent is extended or adjusted under 35 U.S.C. 154(b) by 231 days.

(21) Appl. No.: 16/568,128

(22) Filed: Sep. 11, 2019

(65) Prior Publication Data
US 2020/0084023 A1   Mar. 12, 2020

Related U.S. Application Data

(60) Provisional application No. 62/730,445, filed on Sep. 12, 2018.

(51) Int. Cl.
*H04L 9/06*   (2006.01)
*H04L 9/30*   (2006.01)
(Continued)

(52) U.S. Cl.
CPC .............. *H04L 9/0637* (2013.01); *H04L 9/30* (2013.01); *H04L 9/3218* (2013.01);
(Continued)

(58) Field of Classification Search
CPC ....... H04L 9/0637; H04L 9/30; H04L 9/3218; H04L 9/3247; H04L 63/0421; H04L 2209/38
See application file for complete search history.

(56) References Cited

U.S. PATENT DOCUMENTS

2007/0106892 A1* 5/2007 Engberg ................ H04L 69/329
                                                            713/168
2015/0280911 A1* 10/2015 Andoni .................. H04W 12/37
                                                            713/168

OTHER PUBLICATIONS

Dooley, David "ZK-Snarks & Zero-Knowledge Proofs for Dummies" [online] LinkedIn, Mar. 13, 2018 [retrieved Jun. 24, 2021], Retrieved from the Internet: URL: https://www.linkedin.com/pulse/zk-snarks-zero-knowledge-proofs-dummies-david-dooley (Year: 2018).*

(Continued)

*Primary Examiner* — Taghi T Arani
*Assistant Examiner* — Joshua Raymond White
(74) *Attorney, Agent, or Firm* — Loza & Loza, LLP

(57) ABSTRACT

Methods and systems can prove to an independent verifier that multiple activities registered on decentralized BASE network belong to the same user, without revealing true identity of the user. A selective linkability algorithm provides for linking together activities done under various of user's pseudonyms, without revealing the true user's identity. A reward calculation mechanism calculates a reward based on activities linked using the linking proof. For example, if user can prove that she already successfully completed 10 prior transactions, she might be deemed more valuable to the business making a new offer and hence eligible for a higher reward.

20 Claims, 12 Drawing Sheets

(51) Int. Cl.
H04L 9/32 (2006.01)
H04L 29/06 (2006.01)
(52) U.S. Cl.
CPC ........ *H04L 9/3247* (2013.01); *H04L 63/0421* (2013.01); *H04L 2209/38* (2013.01)

(56) References Cited

OTHER PUBLICATIONS

Albertorio, Anthony "Public Key Cryptography and Digital Signatures" [online] Medium.com, May 3, 2018 [retrieved Jun. 24, 2021], Retrieved from the Internet: URL: https://medium.com/coinmonks/a-laymans-explanation-of-public-key-cryptography-and-digital-signatures-1090d4bd072e (Year: 2018).*

White Paper "Bitclave: Active Search Ecosystem" [online] Bitclave, Sep. 2017 [retrieved Dec. 21, 2021], Retrieved from the Internet: URL: docsend.com/view/ej4wbp2 (Year: 2017).*

"Bitclave: Personalization & Anonymization" [online] Bitclave, Aug. 31, 2017 [retrieved Jun. 24, 2021], Retrieved from the Internet: URL: https://medium.com/@BitClave/personalization-anonymization-3d382b3f1f1b (Year: 2017).*

White Paper "Bitclave: Decentralized Search Ecosystem" [online] Bitclave, Jun. 2017 [retrieved Jun. 24, 2021], Retrieved from the Internet: URL: https://www.scribd.com/document/354054297/BitClave-Whitepaper (Year: 2017).*

BITCLAVE. "Active Search Ecosystem" Whitepaper, Draft v 0.9.3. http://www.docsend.com/view/ej4wbp2 (Sep. 2017).

* cited by examiner

SYSTEMS AND METHODS FOR LINKING ANONYMIZED USER ACTIVITIES WHILE PRESERVING STRONG PRIVACY GUARANTEES

CROSS REFERENCE TO RELATED APPLICATIONS

This patent application and claims the priority and benefit of U.S. provisional patent application No. 62/730,445, titled "METHOD AND APPARATUS TO LINK ANONYMIZED USER ACTIVITIES, PRESERVING STRONG PRIVACY GUARANTEE," filed on Sep. 12, 2018, which is herein incorporated by reference in its entirety.

TECHNICAL FIELD

The embodiments herein relate to public key encryption, cryptographic digital signatures, blockchains, encrypted data storage, transactions, and, more particularly, to linking anonymized user activities while preserving strong privacy guarantees.

BACKGROUND

Blockchain technology began receiving wide interest in 2008 with the popularization of the bitcoin cryptocurrency. Since then, a number of different blockchain technologies have been deployed. In general, a blockchain is a continuously growing list of records, called blocks, which are linked and secured using cryptography. By design, a blockchain is inherently resistant to modification of the data stored in the blocks. Blockchains are often described as open, distributed ledgers recording transactions in a verifiable and permanent way. This description is true for many blockchains although private blockchains and hybrid public/private blockchains have been deployed. For use as a distributed ledger, a blockchain is typically managed by a peer-to-peer network collectively adhering to a protocol for inter-node communication and validating new blocks. Once recorded, the data in any given block cannot be altered retroactively without the alteration of all subsequent blocks, which requires collusion of the network majority.

Blockchains can, as part of their specification, store and execute smart contracts. A transaction on the blockchain can store a smart contract on the blockchain. Another transaction can cause methods or subroutines within the smart contract to be executed, often writing data onto the blockchain.

BRIEF SUMMARY

It is an aspect of the embodiments that a method for linking anonymized user activities while preserving strong privacy guarantees can be implemented by recording user activities in a datastore. A user can use pseudonyms to maintain privacy when performing activities by producing identities, such as a first identity, a second identity, and so forth. The identities can include a pseudonym identifier and a key pair. Key pairs include a private key and a public key. As such, a first identity can include a first pseudonym identifier, a first private kay and a first public key. The first public key can be stored in association with the first pseudonym in a public datastore. The user, acting as the first identity, can perform activities by performing a plurality of first pseudonym activities wherein the plurality of first pseudonym activities is publicly associated with the first pseudonym identifier. The first pseudonym activities can be publicly associated with the first pseudonym by being recorded in a public datastore.

The user, having acted in the guise of various identities, can produce a search identity that includes a user identifier, a private linking key, and a public linking key. Producing a search identity can be followed by producing a search request including search parameters, the user identifier, and the public linking key. Providing the search request to a verifier allows the verifier to try matching the search request to an offer. The offer being one of a plurality of offers comprising offer terms and offer rewards.

The verifier, after receiving the search request can compare the search parameters to the offers. For example, matching the search request to an offer can include checking that the offer reward is within the search parameters, that the offer terms are within the search parameters, or both. If one of the offers is within the search parameters, a matching offer can be produced. The matching offer can include an encrypted session key, an encrypted nonce, and offer parameters. The offer parameters can include the offer reward, the offer terms, or both. The encrypted session key can be a session key encrypted with the public linking key. The encrypted nonce can be a nonce encrypted with the session key. The nonce can be a random number or other value that an eavesdropper would have trouble guessing. Providing the matching offer to the user gives the user an opportunity to decide if the matching offer is interesting enough or relevant enough to follow up on.

After the receiving the matching offer, the user can determine the session key and the nonce. The encrypted session key being the session key encrypted by the public linking key, determining the session key can be performed by decrypting the encrypted session key with the private linking key. The session key can be a symmetric key such that determining the nonce can be performed by decrypting the encrypted nonce with the session key. Here, the verifier encrypts the nonce with the session key and the user decrypts it with the session key.

The user can produce a linking proof that includes the first pseudonym and a first cryptographic proof proving that the user knows the first private key. As discussed above, the first public key is publicly associated with the first pseudonym. Therefore, the first private key is also associated with the first pseudonym, even though the first private key is kept secret. The first cryptographic proof can be the nonce, perhaps known only by the user and the verifier, encrypted with the first private key, perhaps known only by the user. Encrypting the nonce with the first private key produces a first encrypted nonce. Alternatively, the first cryptographic proof can be a digital signature of the nonce, the first private key being the signing key and the first public key being the validation key. The linking proof can be provided to the verifier.

After receiving the linking proof and receiving the first public key, the verifier can use the first public key to verify the first cryptographic proof and link the user to the first pseudonym activities, which are the activities publicly associated with the first pseudonym identifier. The linking proof may have proven that the user performed additional activities that are linked to additional pseudonym identifiers such as a second pseudonym identifier. Furthermore, the user may have performed activities using the search identity, those activities being recorded in association with the user identifier. Therefore, a plurality of activities, including the first pseudonym activities, are all linked to the user.

The verifier can proceed by calculating a reward based on the plurality of activities and the offer terms. The reward can be provided to the user.

A blockchain maintained by a plurality of network nodes can store the search request, the matching offer, and the linking proof. As such, the user can store the search request on the blockchain and the verifier can receive the search request from the blockchain. The verifier can store the matching offer on the blockchain and the user can receive the matching offer from the blockchain. The user can store the linking proof on the blockchain and the verifier can receive the linking proof from the blockchain. The pseudonym identifiers, such as the first pseudonym identifier, can be stored on the blockchain in association with the pseudonym public keys such as the first public key. The verifier can therefore receive the first public key from the blockchain. The plurality of activities can also be stored in association with pseudonym and user identifiers on the blockchain.

The linking proof can comprise a plurality of pseudonym identifiers in association with a plurality of cryptographic proofs, the plurality of cryptographic proofs proving that the user knows a plurality of private keys associated with the plurality of pseudonym identifiers. In such a case, the first pseudonym identifier and a second pseudonym identifier can be among the plurality of pseudonym identifiers. A plurality of public keys can be stored in association with the plurality of pseudonym identifiers and can be received for verifying the plurality of cryptographic proofs. The plurality of cryptographic proofs can be verified by using the plurality of public keys to verify the plurality of cryptographic proofs. The plurality of activities linked to the user can include a plurality of additional activities associated with the plurality of pseudonym identifiers.

The verifier, the user, or both can maintain a blockchain on one or more network nodes. One or both of the entities can participate in maintaining a blockchain with other participants or can use a blockchain maintained by other network nodes. As discussed above, the first public key can be made publicly available by being stored in association with the first pseudonym identifier on the blockchain which is maintained by a plurality of network nodes. The plurality of first pseudonym activities can be publicly associated with the first pseudonym identifier by being stored in association with the first pseudonym identifier on the blockchain. Providing the search request to the verifier can comprise storing the search request on the blockchain. The matching offer can be received from the blockchain. Providing the encrypted linking proof to the verifier can comprise storing the encrypted linking proof on the blockchain. The reward can be received from the blockchain.

As discussed above, a blockchain can store the data and messages used by and exchanged while linking anonymized user activities while preserving strong privacy guarantees. Other datastores can be used instead of or in addition to the blockchain. The datastore should be selected with care because certain properties are required to ensure cryptographic validation can be performed by the user, the verifier, and third-party auditors. A third-party auditor entrusted with at least some of the private keys can audit the methods for linking anonymized user activities while preserving strong privacy guarantees disclosed herein. An open public decentralized storage, such as the well-known interplanetary file system (IPFS), has the desired properties.

The verifier, the user, or both can maintain an open public decentralized storage on one or more network nodes. One or both of the entities can participate in maintaining an open public decentralized storage with other participants or can use an open public decentralized storage maintained by other network nodes. The first public key can be made publicly available by being stored in association with the first pseudonym identifier on the open public decentralized storage which is maintained by a plurality of network nodes. The plurality of first pseudonym activities can be publicly associated with the first pseudonym identifier by being stored in association with the first pseudonym identifier on the open public decentralized storage. Providing the search request to the verifier can comprise storing the search request on the open public decentralized storage. The matching offer can be received from the open public decentralized storage. Providing the encrypted linking proof to the verifier can comprise storing the encrypted linking proof on the open public decentralized storage. The reward can be received from the open public decentralized storage.

It is a further aspect of the embodiments that a computer readable medium storing computer readable instructions, that when executed on one or more processors, implements the methods for linking anonymized user activities while preserving strong privacy guarantees.

Non-transitory computer readable media can store data and computer readable instructions. A computer readable medium storing computer readable instructions that can be executed on one or more processors may implement methods method for linking anonymized user activities while preserving strong privacy guarantees.

BRIEF DESCRIPTION OF THE FIGURES

The embodiments herein will be better understood from the following detailed description with reference to the drawings, in which.

DETAILED DESCRIPTION OF EMBODIMENTS

Figure 1:
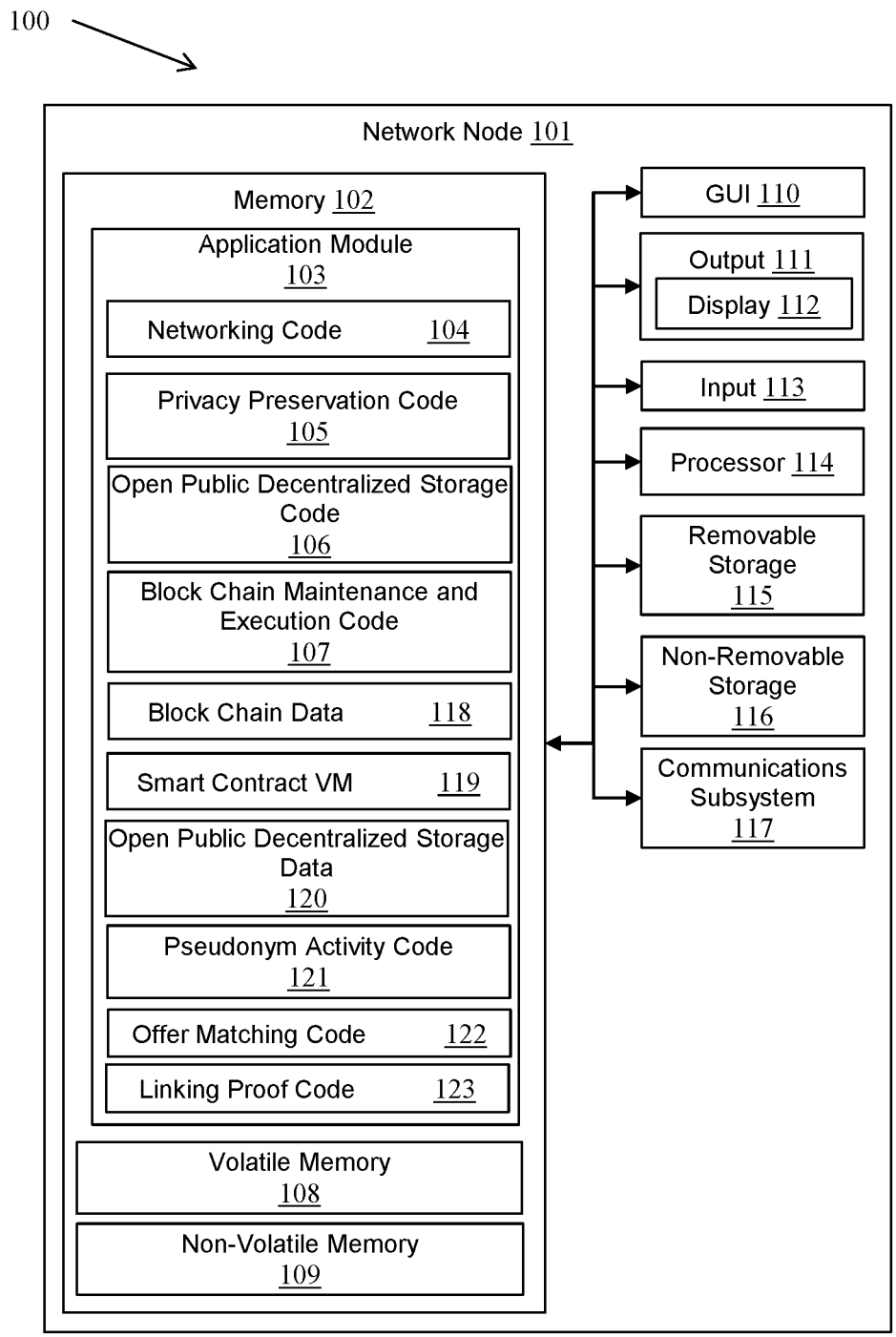
FIG. 1 is a high-level block diagram of a network node supporting systems and methods for linking anonymized user activities while preserving strong privacy guarantees, according to embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose systems and methods for linking anonymized user activities in a distributed, decentralized system and presenting cryptographic proofs of such activities to interested third parties, without revealing the true identity of the user. The embodiments can be realized on the currently deployed blockchains supporting smart contracts such as BASE, Bitcoin, Ethereum, Steller, etc. BASE (BitClave Active Search Ecosystem) is a platform that allows people to store data and enable it for a specific use. In BASE there are two key actors: users and businesses. The embodiments can also be realized using an open public decentralized storage such as the interplanetary file system (IPFS). Users can build their digital persona profile in a way that directly specifies their preferences and interests. This profile is kept encrypted and no one, including BASE, can access it without the user's explicit permission. Businesses can market directly to relevant and motivated users, who match their target audience. If users agree to reveal their profile to a business, they can get compensated. The value is being transitioned directly from advertiser to user and not into the pocket of the middleman. A verifier can, in response to a user's search request, help a user respond to an offer and receive a reward.

BASE relies on blockchain for storage and management of data related to customer activities in the search ecosystem. Data can be stored in off-chain open storage like IPFS where only the hash of the data is stored on the blockchain. These activities are created by software endpoints operated by either the customers themselves or by the retailers they interact with. As such, various forms of software applications including retail websites and marketing dashboards can read to and write from the blockchain. As the BASE ecosystem is decentralized and open, anyone can create such software that interacts with the customer and publish their data to the blockchain. Of particular note, user-facing software has the capability to anonymize information contributed to the blockchain, creating what is referred to as the anonymous activity ledger. Activity anonymization is done in a way that allows only authorized parties to attribute multiple activities to the same customer. For all other parties, the data is not attributable to specific individuals (or linkable beyond certain lengths of times) while remaining valuable for statistical and data aggregation purposes. This gives the customer control over what data is allowed to be created, shared, and accessed, all managed and enforced through the use of blockchain and smart contracts.

At a high level, anonymity can be achieved by allowing a single user to post to the BASE activity ledger using a variety of unrelated pseudonyms, or alternate identities. The use of multiple identities is already supported in many blockchain platforms, as any customer can create an arbitrary number of accounts, wallets, or public key identifiers; this is already common in cryptocurrency platforms like Bitcoin. There are several reasons, beyond privacy, that a user may want to do this. For example, suppose that a user uses BASE while shopping for business needs and also for personal needs. If both of these tasks are performed using the same identity, as is typically done today through monolithic ad networks, both of these roles are combined into a single "customer profile", so the user will be shown ads that relate to both their business and personal lives. If, however, a user could create two separate personas, based on different pseudonymous identities, the search activities could be effectively isolated from each other, allowing the user to separate the ads they see based on their current role. While the different pseudonyms approach solves customer concerns with regards to anonymization, it introduces a challenge for businesses as now they need to have a way to know that two different pseudonyms asking for a service actually belong to the same person, to prevent paying out a reward twice.

In a more general sense, user-facing software can support the use of multiple pseudonyms for a user's search activities, either in support of multiple personas as above, or to truly anonymize the user's search with a different pseudonym for each activity contributed to the ledger. Even in this case, BASE supports the ability to later allow the user to selectively reveal information about these anonymous acts. Specifically, metadata can be included in the activity's fields that can later be used to reveal the true identity of the user or to reveal links between different pseudonyms (even without exposing the user's true identity), noting that both of these can be allowed selectively to only a specific list of authorized parties.

As mentioned above, the customer can choose to use pseudonyms for different activities in BASE, so the activities cannot be linked together. While this protects the customer's search history, it hides useful information from businesses. In some cases, the customer may want to reveal certain links to a business without (i) revealing ALL transaction history or (ii) revealing links to undesired businesses. This ability is referred to as selective linkability. The embodiments can use zero-knowledge cryptography to link multiple pseudonyms without revealing the user's true identity. For example, given the hash of a random number, the prover could convince the verifier that there indeed exists a number with this hash value, without revealing what it is. In the context of BASE, this enables users and businesses to complete actions like issuing and accepting offers, without any observer of the network learning any details of the transaction other than the fact it was done correctly.

Referring now to the drawings where similar reference characters may denote corresponding features consistently throughout the figures, there are shown embodiments.

FIG. 1 is a high-level block diagram 100 of a network node 101 supporting systems and methods for preserving privacy and incentivizing third-party data sharing, according to embodiments disclosed herein. A computing device in the form of a computer 101 configured to interface with controllers, peripheral devices, and other elements disclosed herein may include one or more processing units 114, memory 102, removable storage 115, and non-removable storage 116. Memory 102 may include volatile memory 108 and non-volatile memory 109. Network node 101 may include or have access to a computing environment that includes a variety of transitory and non-transitory computer-readable media such as volatile memory 108 and non-volatile memory 109, removable storage 115 and non-removable storage 116. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including blockchain data, open public decentralized storage data, and computer code.

Network node 101 may include, or have access to, a computing environment that includes input 113, output 111, and a communications subsystem 117. The network node 101 may operate in a networked environment using a communications subsystem 117 to connect to one or more remote computers, remote sensors and/or controllers, detection devices, hand-held devices, multi-function devices (MFDs), speakers, mobile devices, tablet devices, mobile phones, Smartphone, or other such devices. The remote computer may also be a personal computer (PC), server, router, network PC, RFID enabled device, a peer device or other common network node, or the like. The communication connection may include a LAN, a WAN, Bluetooth connection, or other networks.

Output 111 is most commonly provided as a computer monitor, but may include any output device. Output 111 and/or input 113 may include a data collection apparatus associated with network node 101. In addition, input 113, which commonly includes a computer keyboard and/or pointing device such as a computer mouse, computer track pad, touch screen, or the like, allows a user to select and instruct network node 101. A user interface can be provided using output 111 and input 113. Output 111 may include a display 112 for displaying data and information for a user, or for interactively displaying a GUI (graphical user interface) 110. A GUI is typically responsive of user inputs entered through input 113 and typically displays images and data on display 112.

Note that the term "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with a user input device 113 such as, for example, a pointing device such as a mouse, and/or with a keyboard. A particular item can function in the same manner to the user in all applications because the GUI provides standard software routines (e.g., the application module 103 can include program code in executable instructions, including such software routines) to handle these elements and report the user's actions.

Computer-readable instructions, for example, program code in application module 103, can include or be representative of software routines, software subroutines, software objects, etc. described herein, are stored on a computer-readable medium and are executable by the processor device (also called a processing unit) 114 of network node 101. The application module 103 can include computer code such as networking code 104, privacy preservation code 105, open public decentralized storage code 106, blockchain maintenance and execution code 107, blockchain data 118, smart contract VM 119, open public decentralized storage data 120, pseudonym activity code 121, offer matching code 122, and linking proof code 123. A hard drive, CD-ROM, RAM, Flash Memory, and a USB drive are just some examples of articles including a computer-readable medium.

Privacy preservation code 105 can include code for asymmetric encryption, symmetric encryption, digital signatures, and for maintaining a user's private data related to pseudonyms and identities that the user creates. Open public decentralized storage code 106 can maintain a local node storing open public decentralized storage data 120 for open public decentralized storage such as IPFS. Blockchain maintenance and execution code 107 can maintain a local node storing blockchain data 118 for a blockchain such as the blockchains of bitcoin, Ethereum, and BASE. A smart contract VM 119 can be an implementation of a VM defined for a blockchain that executes smart contracts that are stored on the blockchain, such as the well-known smart contract VMs for bitcoin and Ethereum. Pseudonym activity code 121 can record a user's activities in association with a pseudonym identifier on a datastore such as on a blockchain or in an open public decentralized storage. Offer matching code can use search parameters to find an offer matching a search request. Linking proof code 123 can verify linking proofs.

Figure 2:
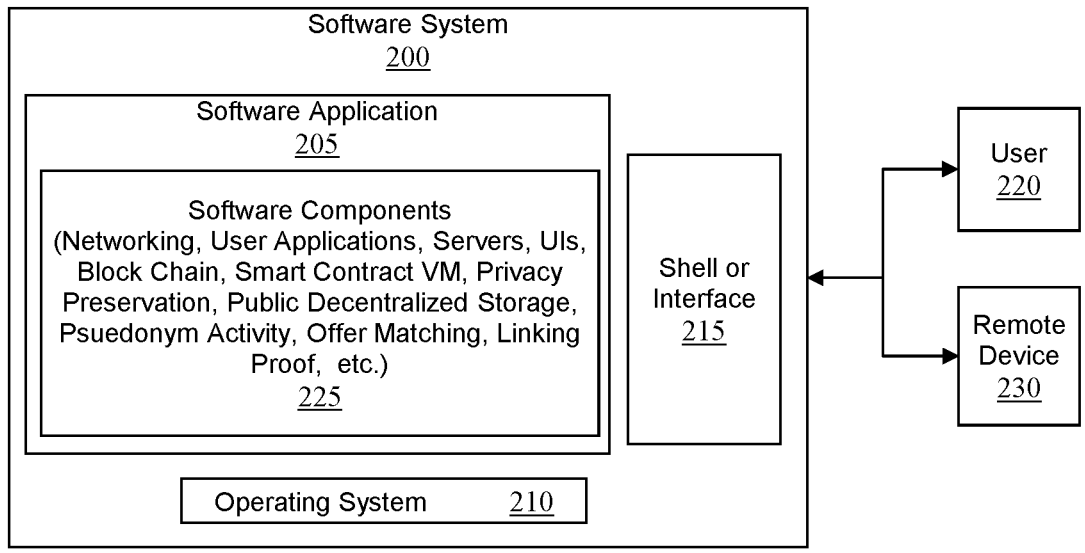
FIG. 2 is a high-level block diagram of a software system, according to embodiments disclosed herein.

FIG. 2 is a high-level block diagram of a software system 200, according to embodiments herein. FIG. 2 illustrates a software system 200, which may be employed for directing the operation of the data-processing systems such as network node 101. Software applications 205, may be stored in memory 102, on removable storage 115, or on non-removable storage 116, and generally includes and/or is associated with a kernel or operating system 210 and a shell or interface 215. One or more application programs may be "loaded" (i.e., transferred from removable storage 115 or non-removable storage 116 into the memory 102) for execution by the network node 101. An application program 205 can include software components 225 such as software modules, software subroutines, software objects, network code, user application code, server code, UI code, blockchain code, smart contract VM code, privacy preservation code, Public decentralized storage code, pseudonym activity code, offer matching code, linking proof code, etc. The software system 200 can have multiple software applications each containing software components. The network node 101 can receive user commands and data through interface 215, which can include input 113, output 111, and communications connection 117 accessible by a user 220 or remote device 230.

These inputs may then be acted upon by the network node 101 in accordance with instructions from operating system 210 and/or software application 205 and any software components 225 thereof.

Generally, software components 225 can include, but are not limited to, routines, subroutines, software applications, programs, objects, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component," "module" as utilized herein may refer to one of or a collection of routines and data structures that perform a particular task or implements a particular abstract data type. Applications and components may be composed of two parts: an interface, which lists the constants, data types, variables, and routines that can be accessed by other modules or routines; and an implementation, which is typically private (accessible only from within the application or component) and which includes source code that actually implements the routines in the application or component. The terms application or component may also simply refer to an application such as a computer program designed to assist in the performance of a specific task such as word processing, accounting, inventory management. Components can be built or realized as special purpose hardware components designed to equivalently assist in the performance of a task.

The interface 215 can include a graphical user interface 110 that can display results, whereupon a user 220 or remote device 230 may supply additional inputs or terminate a particular session. In some embodiments, operating system 210 and GUI 110 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 210 and interface 215. The software application 205 can include, for example, software components 225, which can include instructions for carrying out steps or logical operations such as those shown and described herein.

The description herein is presented with respect to embodiments that can be embodied in the context of, or require the use of, a data-processing system such as network node 101, in conjunction with program code in an application module 103 in memory 102, software system 200, or network node 101. The disclosed embodiments, however, are not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

Network nodes 101 and software systems 200 can take the form of or run as virtual machines (VMs) or containers that run on physical machines. As discussed here, a VM can be different from a smart contract VM and the two terms should not be used interchangeably. A VM or container typically supplies an operating environment, appearing to be an operating system, to program code in an application module and software applications 205 running in the VM or container. A single physical computer can run a collection of VMs and containers. In fact, an entire network data processing system including a multitude of network nodes 101, LANs and perhaps even WANs or portions thereof can all be virtualized and running within a single computer (or a few computers) running VMs or containers. Those practiced in cloud computing are practiced in the use of VMs, containers, virtualized networks, and related technologies.

Figure 3A:
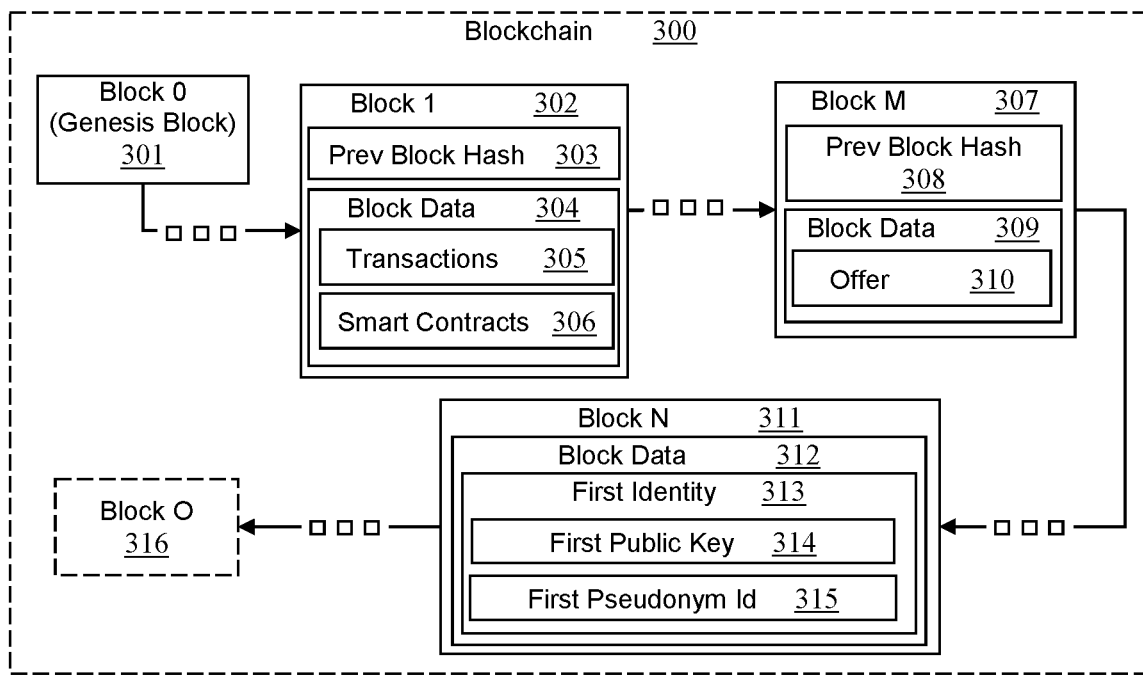
FIGS. 3A and 3B are high-level block diagrams of a blockchain, according to embodiments disclosed herein.
Figure 3B:
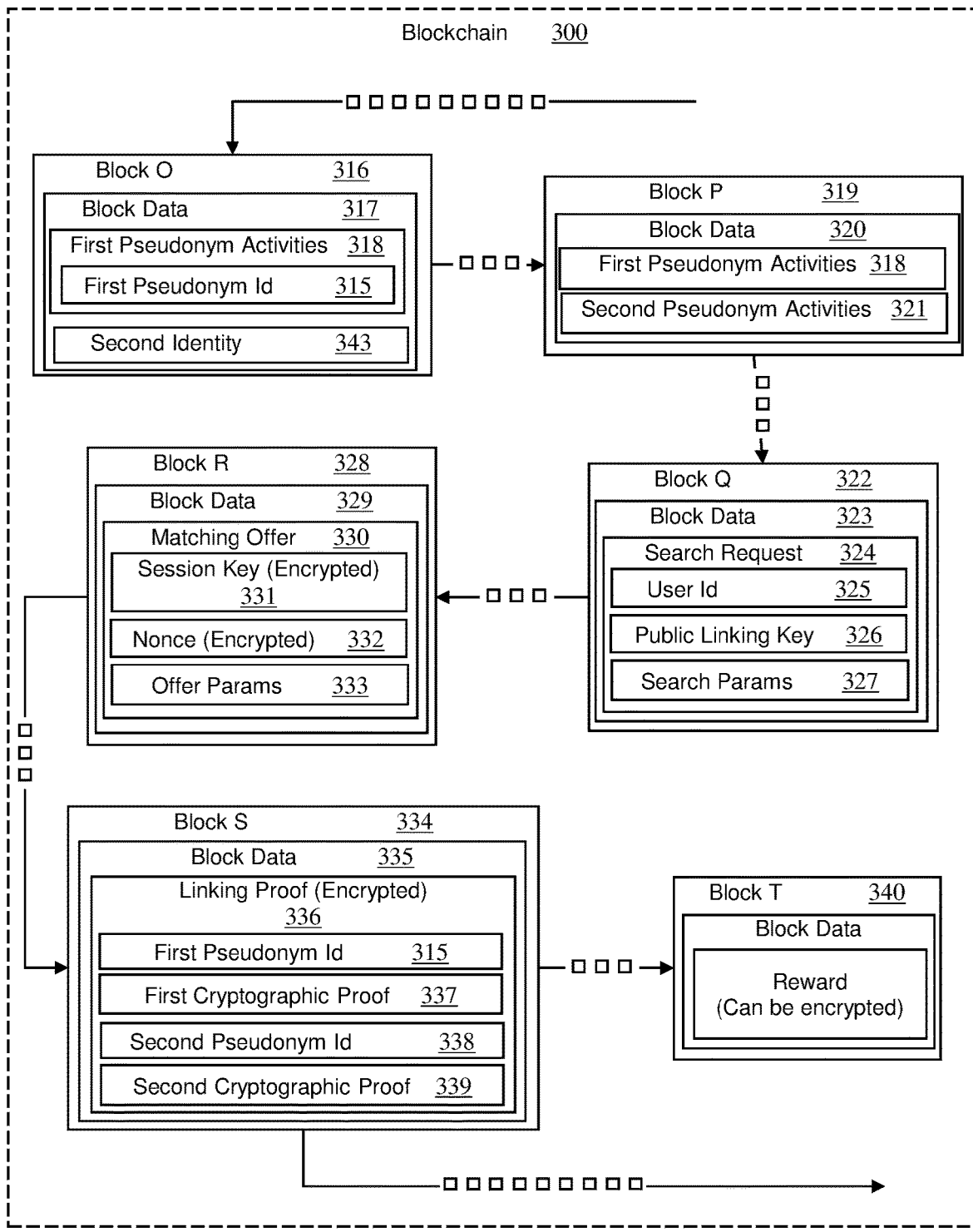

FIGS. 3A and 3B are a high-level block diagram of a blockchain 300, according to embodiments disclosed herein. The very first block, block 0 301, of a blockchain is often called the genesis block. A blockchain 300, being a sequence of blocks, block 1 302 follows block 0 301. Block 1 302 can contain a previous block hash 303, block data 304, a time stamp, and other information. Block data 304 can include transactions 305, smart contracts 306, and other data. For block 1 302, the previous block hash 303, can be the block hash of block 0 301. In many blockchains, the previous block hash is a cryptographic signing, or digital signature, of the previous block. Altering a block on a blockchain is immediately discoverable because the altered block's digital signature is different from that stored in the previous block hash of the next block. As such, the next block would also have to be altered to have the correct digital signature, changing its digital signature. It is the chain of digital signatures that makes blockchains theoretically immutable because attempting to alter one block means that every subsequent block must be altered. Such alteration can be made arbitrarily difficult or unlikely through a signing protocol such as proof-of-work, proof-of-stake, randomly selected trusted party, etc. Those familiar with blockchains or cryptocurrencies know of a variety of signing protocols.

Digital signatures can be used to cryptographically sign data such as a previous block, a transaction, user information, etc. Most blockchains rely on one of the proven techniques for producing cryptographically secure digital signatures of data such as DSA (digital signature algorithm) developed by the National Institute of Standards and Technology, Elliptic curve DSA which is a variant of DSA, ElGamal, etc. Herein, digital signatures and cryptographic signatures refer to cryptographically secure signatures of data. A digital signature for specific data can be produced from the data and a private key. A digital signature can be verified using the data and a public key. Note that the data must be available in order to verify it using the public key. With respect to digital signatures, the private key is often called a signing key while the public key is often called a validation key.

Digital signatures are different from data encryption because in data encryption the data is encrypted with an encryption key and therefor unreadable without a decryption key. Digital signatures sign data, encrypted or unencrypted, such that the signature can be verified using the signer's public key and the signed data. Encryption transforms the data into encrypted data that is unreadable without a decryption key. In practice, data is encrypted using one of the proven data encryption techniques such as the Advanced Encryption Standard (AES), Blowfish, Twofish, Serpent, etc. Asymmetric encryption techniques use a key pair, two keys often called a private key and a public key, with one key decrypting what the other key encrypts. Symmetric techniques use a single key that both encrypts and decrypts.

Returning to FIGS. 3A and 3B, the blockchain has a plethora of blocks. The arrows overlaid by tiny blocks, such as the arrow between block 1 302 and block M 307, indicate that there can be many intervening blocks. Following block M 307 on the blockchain 300 are block N 311, block O 316, block P 319, block Q 322, block R 328, block S 334, and block T 340. Block M 307 is shown including the block M-1 block hash 308 and block data 309. The block data 309 includes an offer 310. A business may have published the offer 310 to the blockchain. Note that the illustrated block 1 302 is a non-limiting example in that every block can contain block data including transactions, smart contracts, data, etc.

The block data 312 of block N 311 is illustrated as including a pseudonym, first identity 313. Pseudonyms and true identities can be indistinguishable because both have an identifier and public key. Here the user has stored a first pseudonym identifier 315 in association a first public key 314. The first private key, which forms a key pair with the first public key, can be kept secret by the user. Block data 317 of block O 316 is illustrated as containing first pseudonym activities 318 stored in association with the first pseudonym identifier 315. The block data 317 also contains a second identity 343 that, like other pseudonyms and true identities, has a second pseudonym identifier stored in association with a second public key. Data block 320 of block P 319 contains first pseudonym activities 318 and second pseudonym activities 321. The first pseudonym activities 318 of data block 320 are additional activities stored in association with the first pseudonym identifier 315. The second pseudonym activities are activities stored in association with a second pseudonym identifier.

Data Block Q 323 of block Q 322 is illustrated as containing a search request 324. The user may have stored the search request 324 on the blockchain 300. The search request 324 contains a user id 325, public linking key 326, and search parameters 327. The verifier can evaluate offers, such as offer 310, to see if any of the offers meet the search parameters 327. Block data 329 of block R 328 is illustrated as containing a matching offer 330. The matching offer 330 can include an encrypted session key 331, an encrypted nonce 332, and offer parameters 333 from the offer matching the search request 324. The nonce can be a random number or other number that can be used for verifying information in future communications. The session key can be a symmetric encryption key generated for use in securing future communications between the user and the verifier. Note that, at this point, the verifier might not know the user's actual identity, but does know the user's user identifier 325 and the public linking key 326.

The user may respond to the matching offer 330 by sending an encrypted linking proof 336 to the verifier. Data block 335 of block S 334 is illustrated as including the encrypted linking proof 336. The encrypted linking proof 336 can be a linking proof encrypted by the session key. The linking proof can contain pseudonym identifiers 315, 338 and cryptographic proofs 337, 339. Each cryptographic proof 337, 339 proves that the encrypted linking proof 336 was produced by an entity with knowledge of specific private keys. The first cryptographic proof can be the first encrypted nonce, which is the nonce encrypted with the first private key. If the nonce is produced when decrypting the first cryptographic proof with the first public key, then the user has been validated as being associated with the first pseudonym identifier. If the nonce is produced when decrypting the second cryptographic proof, meaning the second cryptographic proof is the second encrypted nonce, with the second public key, then the user has been validated as being associated with the second pseudonym identifier. As discussed above, digital signatures of the nonce can be used instead of encryption. When using digital signatures, the public key can be the validation key while the signing key is the private key the user can keep secret. The digital signature can be verified using the validation key proving the user had the signing key such that an association between the user and a pseudonym is verified.

After verifying the linking proof, the activities of the pseudonyms can be associated with the user. The verifier can keep such associations a secret to thereby preserve the user's privacy to the extent that the verifier ever knows the user's actual identity. A reward for the user can be determined by evaluating the user's activities against the offer's terms or rewards.

A reward can take many forms ranging from rebates, cash rewards, free goods, free services, free licenses, discounts, or other rewards valued by the user. The offer can be based on a single activity such as a purchase or can be based on a combination of activities. Those practiced in databasing and marketing of personal data are well aware of existing techniques for tracking online and offline activities for the purpose of targeting marketing. For example, an entity that in the past year bought five laptop computers, searched for customer relationship software, searched for IP phone services, and bought airfare and lodging coinciding with a trade show may be offered, as a reward, credit towards software licenses and free entry into a private event at the trade show. An entity that bought a gaming console can be offered games at a discount and a free month of a video streaming service. An entity that applied for a rebate and bought the associated goods may receive cryptocurrency as a rebate.

Figure 4:
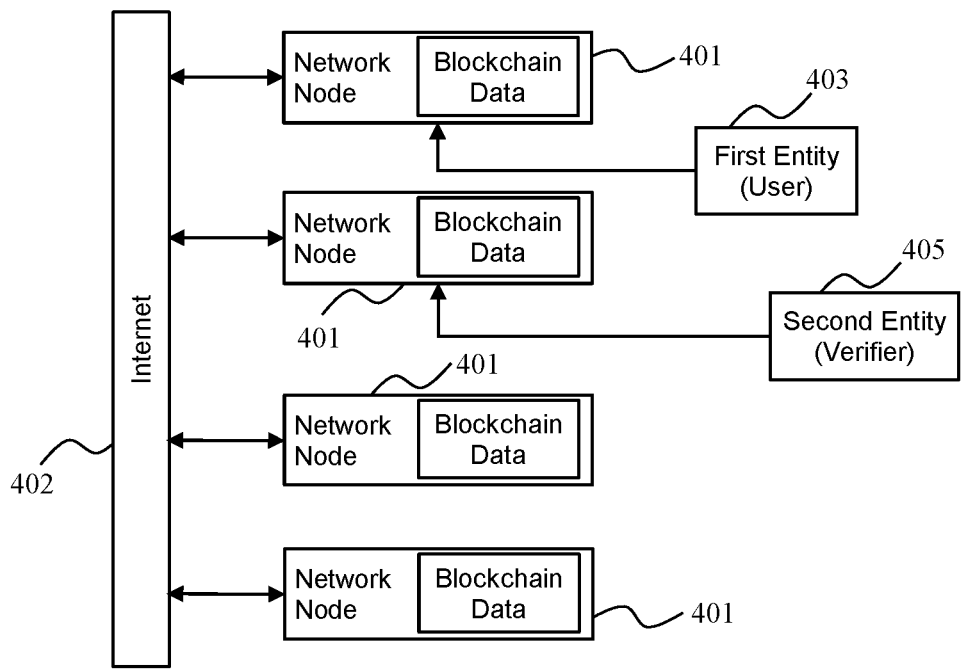
FIG. 4 depicts network nodes maintaining a blockchain, according to embodiments disclosed herein.

FIG. 4 depicts network nodes 401 maintaining a blockchain, according to embodiments disclosed herein. The network nodes 401 are illustrated as being able to communicate via the internet 402 and as having blockchain data. Blockchains are commonly maintained by many network nodes 401 with each maintaining its own version of the blockchain. In a trustless environment, the network nodes do not trust each other to have accurate copies of the blockchain and therefor process and store each block as it is signed. The blockchain maintenance and execution code 107 run by the network nodes 401 can be different programs written to implement a published standard for the blockchain. The smart contract VM 119 run by the network nodes 401 can implement a standardized VM specified for the blockchain. Note that the smart contract VM 119 can be considered to be executable code within the blockchain execution and maintenance code 107 of the network nodes 401. The smart contracts are executable code that can be executed by a smart contract VM. For example, an entity can enter a transaction on the blockchain 300 that provides input data to and invokes a method or subroutine within the smart contract. The smart contract VM can run the method or subroutine using the input data and store the result on the blockchain. Those practiced in the art of blockchain distributed applications (dApps) are familiar with writing, deploying, accessing, transacting with, and interacting with smart contracts.

The first entity 403 is shown interacting with one of the network nodes 401. The second entity 405 is also shown interacting with one of the network nodes 401. By interacting with the network nodes 401, the entities 403, 405 can submit data and transactions for storage on the blockchain. Some of the data and transactions stored on the blockchain can be processed by smart contracts that store output data on the blockchain.

Figure 5:
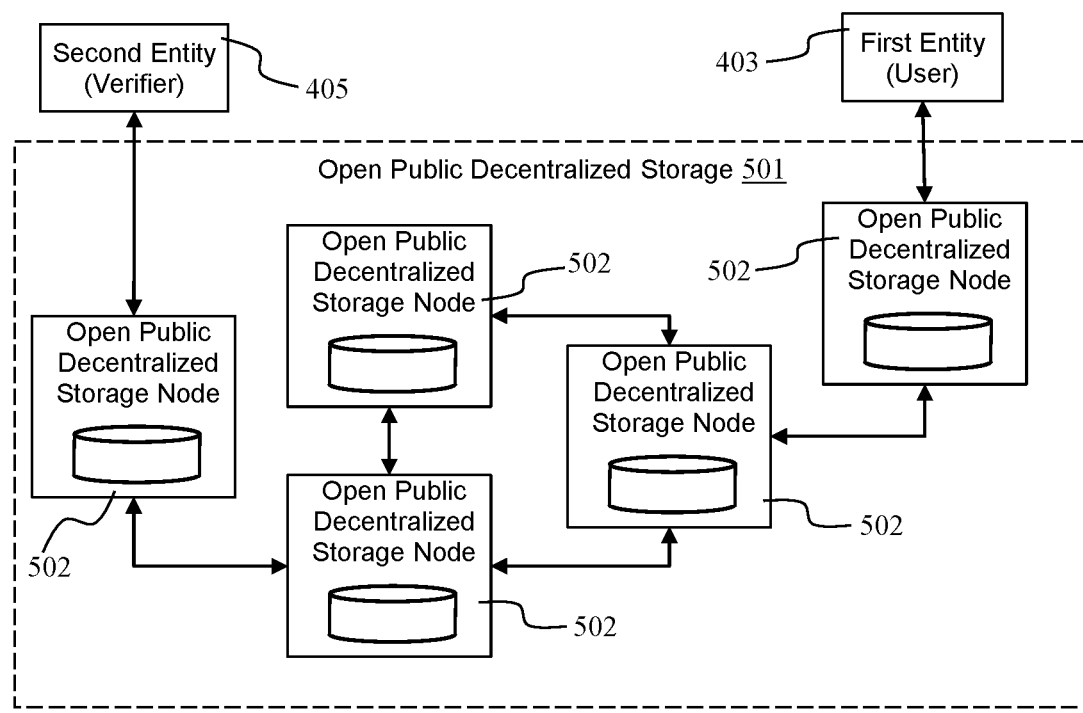
FIG. 5 depicts network nodes maintaining an open public decentralized storage, according to embodiments disclosed herein.

FIG. 5 depicts network nodes 502 maintaining an open public decentralized storage (OPDS) 501, according to embodiments disclosed herein. The verifier 405 and the user 403 can access the OPDS 501 through OPDS network nodes 502 to thereby read data from or write data to the ODPS.

The well-known IPFS is an example of an OPDS. An open public decentralized storage has properties that help ensure that transactions, data, and communications stored in the OPDS can be verified as having been performed correctly, stored correctly, and not tampered with. Open indicates that the code being run to implement and maintain the OPDS is available to those who may want to audit or examine the system for errors. For example, security audits are becoming increasingly common for both open and closed source applications. The IPFS technical specs and computer code implementing those specifications is, as this document is being drafted, openly and freely available at github.com/ipfs. Public indicates that the datastore can be accessed by the public. Much of the data may be encrypted. There is no requirement that data in an OPDS be unencrypted, only that it can be accessed in whatever form it is stored. Data on the IPFS can be accessed by anyone and is therefore public. The data being publicly accessible, it can be audited by third parties. For example, a third party can confirm that a request message was responded to and, using cryptographic techniques, can verify aspects of requests and responses even if they are encrypted and unreadable. Decentralized means that the data may be stored by many network nodes and may be preserved after the loss of any one network node or even of many network nodes. IPFS is decentralized in that it replicates data across network nodes and has no master node or nodes.

Figure 6:
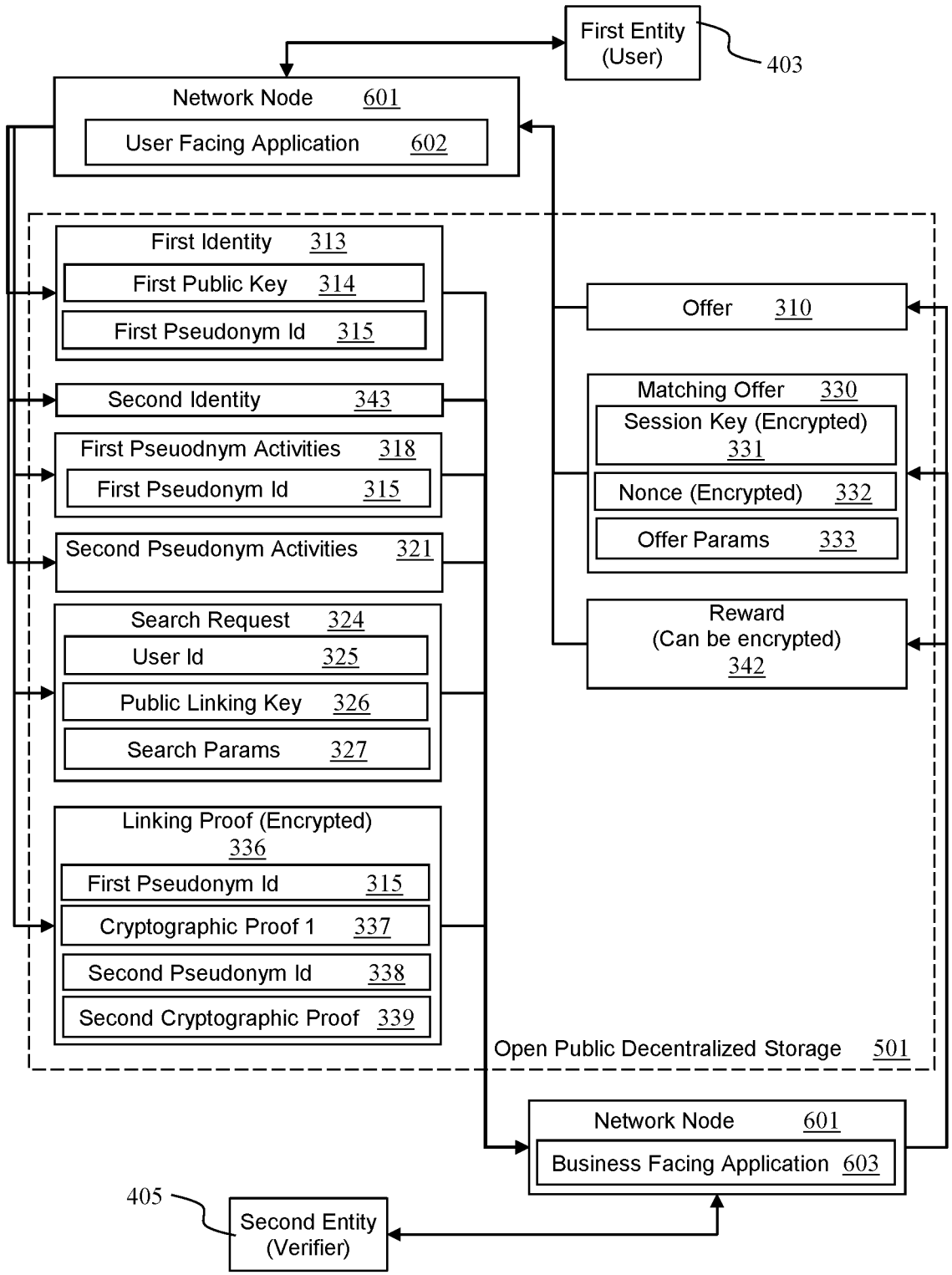
FIG. 6 is a high-level block diagram of an open public decentralized storage storing data and communications, according to embodiments disclosed herein.

FIG. 6 is a high-level block diagram of an open public decentralized storage 501 storing data and communications, according to embodiments disclosed herein. In FIG. 6, the OPDS 501 is storing the data and communications that are stored in the data blocks of blockchain 300 of FIGS. 3A and 3B. The directions of the arrows indicate which entity is storing and which entity is reading the data and communications. The OPDS being public, any entity can read the data and communications. However, in order to perform the methods of the embodiments, the verifier 405 uses a business facing application 603 running on a network node 601 to receive the data and communications on the left side of the OPDS 501. Similarly, the user 403 uses a user facing application 602 running on a network node 601 to receive the data and communications on the right side of the OPDS 501.

Figure 7:
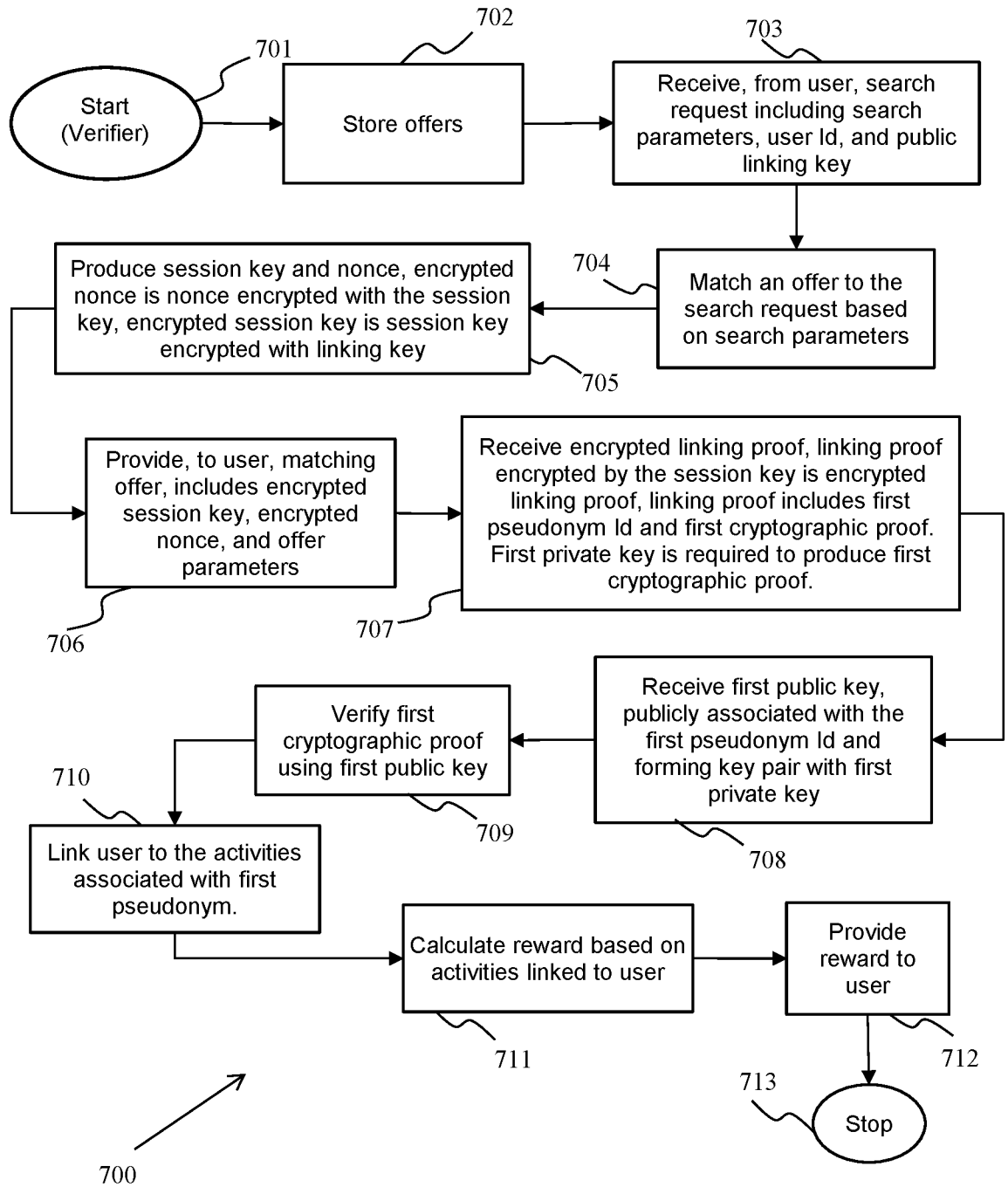
FIG. 7 is a flow chart illustrating an example, from a verifier's perspective, of a method for linking anonymized user activities while preserving strong privacy guarantees, according to embodiments disclosed herein.

FIG. 7 is a flow chart illustrating an example, from a verifier's perspective, of a method for linking anonymized user activities while preserving strong privacy guarantees 700, according to embodiments disclosed herein. After the start 701, the verifier can store offers 702 in a datastore. The verifier can receive a search request from a user 703. The search request can include search parameters, a user identifier, and a public linking key. The verifier can match an offer to the search request based on the search parameters 704. The verifier can produce a session key and a nonce 705. The encrypted nonce can be the nonce encrypted with the session key. The encrypted session key can be the session key encrypted with the linking key. The verifier can provide, to the user, a matching offer 706. The matching offer can include the encrypted session key, the encrypted nonce, and offer parameters that can be based on the offer terms and the offer conditions of the offer that matched the search parameters. In response to the matching offer, the user can send an encrypted linking proof. The verifier can receive the encrypted linking proof 707. The linking proof may be encrypted by the session key. The session key being a symmetric key, the encrypted linking proof can be decrypted with the session key to obtain the linking proof. The linking proof can include the first pseudonym identifier and a first cryptographic proof. The first private key is required to produce the first cryptographic proof. The cryptographic proofs can be the nonce after encryption by a private key or can be a digital signature of the nonce signed by a private key.

The first public key can be received from wherever it is stored in association with the first pseudonym identifier 708. The first cryptographic proof can be verified using the first public key 709. In fact, all the cryptographic proofs in the linking proof can be verified using public keys associated with pseudonym identifiers. The verifier can link the user to the first pseudonym activities, 710. The first pseudonym activities can be the activities associated with the first pseudonym identifier. The verifier can calculate a reward based on the activities linked to the user 711. A reward can be provided to the user 712 before the process stops 713.

Figure 8:
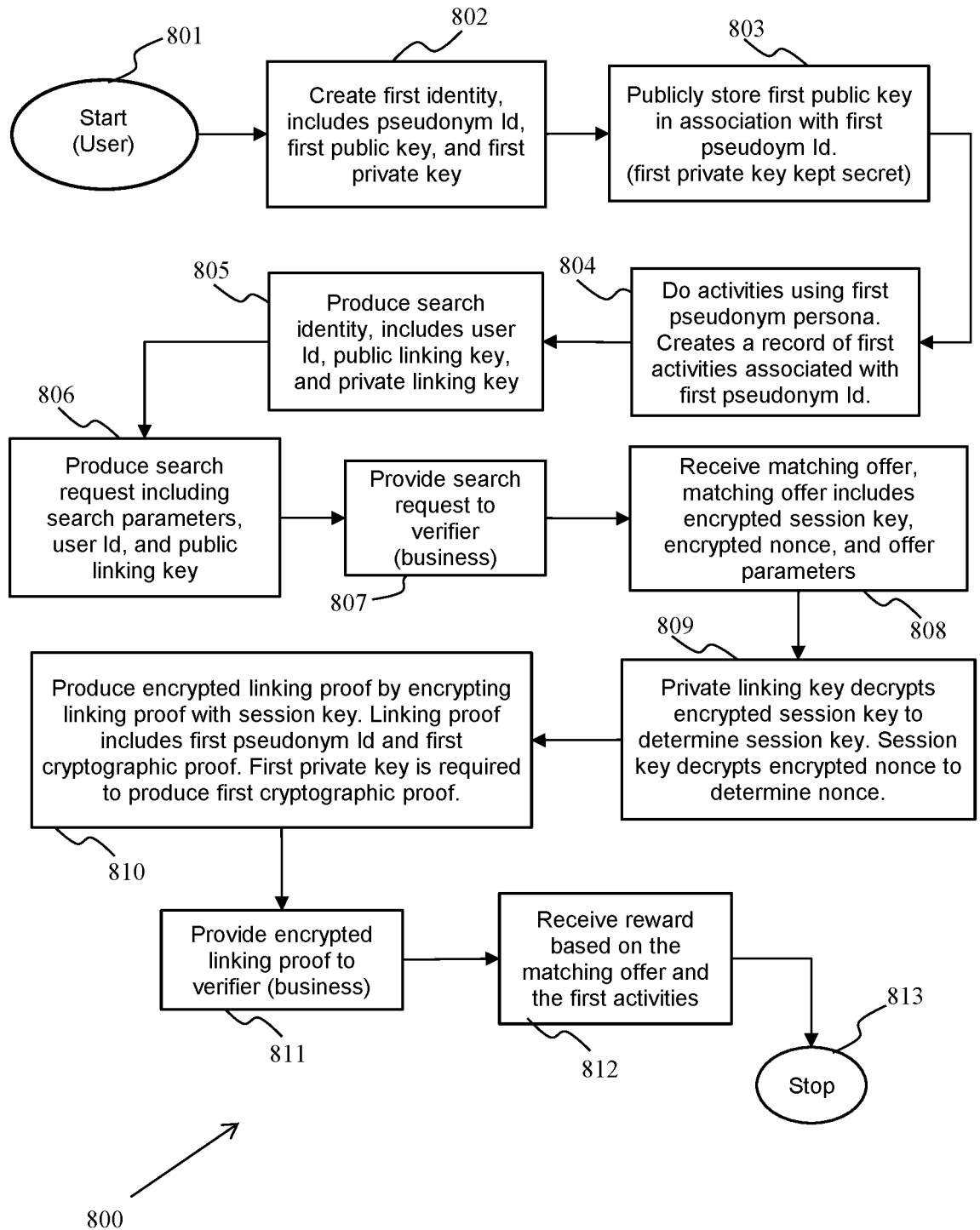
FIG. 8 is a flow chart illustrating an example, from a user's perspective, of a method for linking anonymized user activities while preserving strong privacy guarantees, according to embodiments disclosed herein.

FIG. 8 is a flow chart illustrating an example, from a user's perspective, of a method for linking anonymized user activities while preserving strong privacy guarantees 800, according to embodiments disclosed herein. After the start 801 the user can create a first identity 802. The first identity can include a pseudonym identifier, a first public key, and a first private key. The first public key can be publicly stored in association with the first pseudonym identifier 803. The first private key can be kept secret. The user can, acting as the first identity, perform various activities 804. Records of the various activities may be stored in a datastore in association with the first pseudonym identifier. The user can produce a search identity having a user identifier, a public linking key, and a private linking key 805. The user can produce a search request including search parameters, the user identifier, and the public linking key 806 and can provide the search request to the verifier 807. In response to the search request, the verifier may send the user a matching offer 703-706. The user can receive the matching offer 808. The matching offer can include an encrypted session key, an encrypted nonce, and offer parameters. The user can determine the session key and the nonce 809. The private linking key decrypts the encrypted session key to determine the session key. The session key decrypts encrypted nonce to determine the nonce. If the user is interested in the offer, the user may produce an encrypted linking proof 810 and provide the encrypted linking proof to the verifier 811. The encrypted linking proof is a linking proof encrypted by the session key. The linking proof can include the first pseudonym identifier and the first cryptographic proof. The first cryptographic proof is produced from the nonce and the first private key. After verifying the linking proof 708, 709, linking the user to the first pseudonym activities, and calculating a reward 711, the verifier can provide the reward to the user 711. The user can receive the reward 812 before the process stops 813.

FIGS. 9-15 illustrate a number of short processes as are commonly used in asynchronous processing or event driven processing. Smart contracts can be written to contain short processes to thereby avoid having to wait for input. In contrast, the methods of FIGS. 7 and 8, could have wait states such that the methods wait at certain points for input to be received. One practiced in the programming arts is familiar with implementing processes as synchronous, possibly with wait states, or as asynchronous, possibly event driven. Based on FIGS. 9-15, it is clear that the methods described herein can, to a large extent, be performed by smart contracts.

Figure 9:
FIG. 9 is a flow chart illustrating an example of a verifier storing offers in a datastore, according to embodiments disclosed herein.

FIG. 9 is a flow chart illustrating an example of a method for a storing offers in a datastore 900, according to embodiments disclosed herein. After the start 901, the verifier stores the offers in a datastore 702, before the method stops 902. As discussed above, the data store can be a blockchain, an OPDS, etc.

Figure 10:
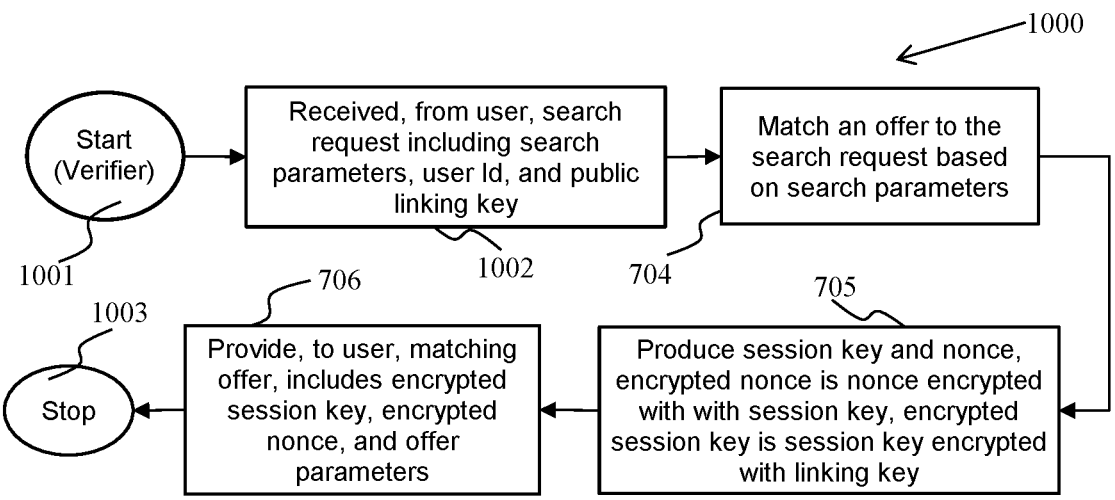
FIG. 10 is a flow chart illustrating an example of a verifier providing a matching offer, according to embodiments disclosed herein.

FIG. 10 is a flow chart illustrating an example of a method for a verifier providing a matching offer 1000, according to embodiments disclosed herein. After the start 1001, having received a search request 1002 an offer that matches the search parameters can be found 704. A session key and a nonce can be produced and encrypted 705 for inclusion in a matching offer sent to the user 706 before the method stops 1003.

Figure 11:
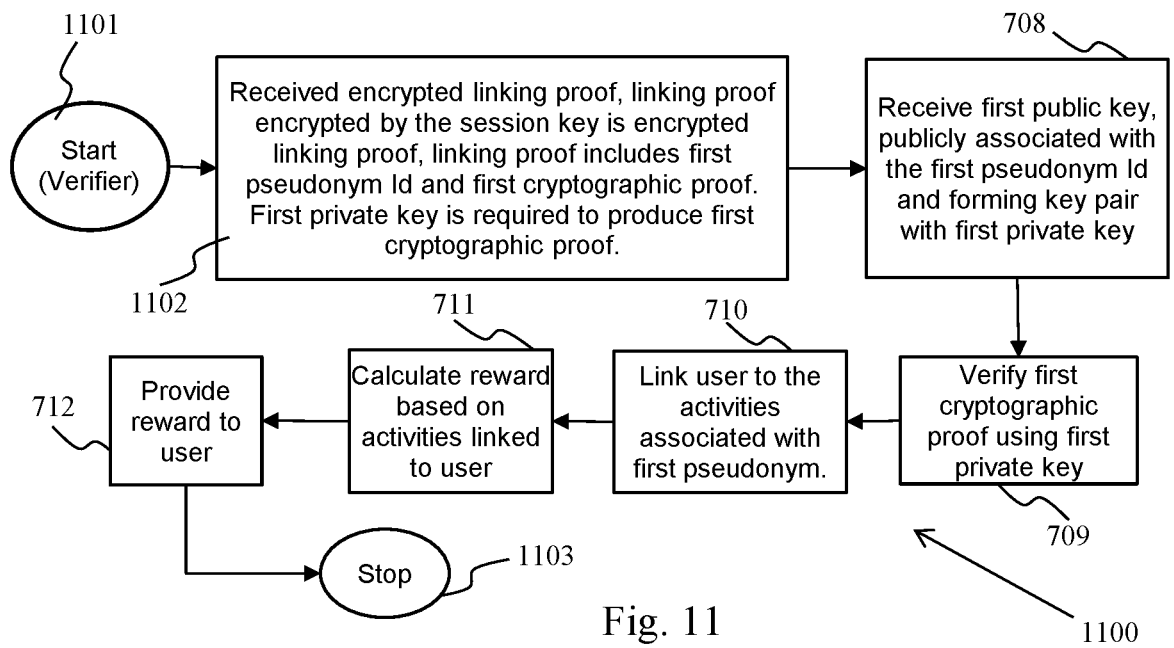
FIG. 11 is a flow chart illustrating an example of a verifier verifying a linking proof and sending a reward to a user, according to embodiments disclosed herein.

FIG. 11 is a flow chart illustrating an example of a method for a verifier verifying a linking proof and sending a reward to a user 1100, according to embodiments disclosed herein. After the start 1101, having received an encrypted linking proof from the user 1102, the public keys needed for verifying the linking proof can be obtained 708. The cryptographic proofs in the linking proof can be verified 709 before the user is linked to the activities associated with the pseudonym identifiers in the linking proof 710. A reward can be calculated based on the activities linked to the user 711. The reward can be provided to the user 712 before the method stops 1103.

Figure 12:
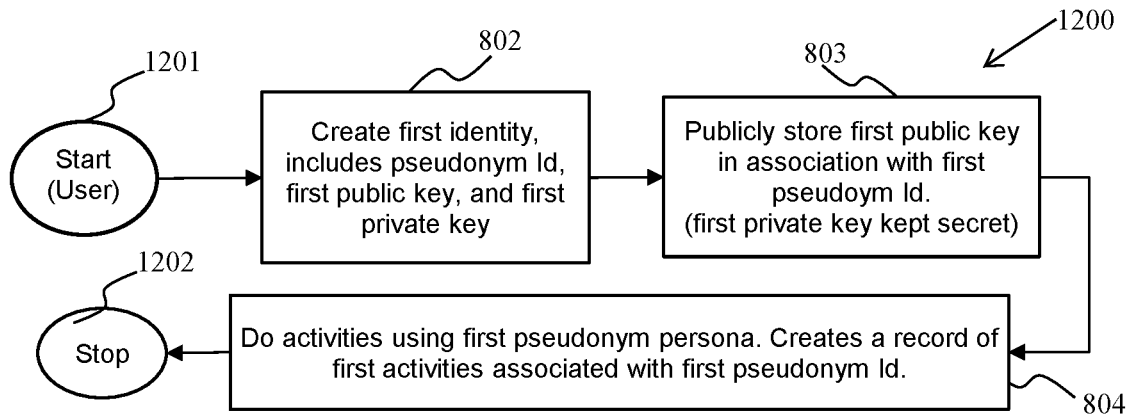
FIG. 12 is a flow chart illustrating an example of a user performing activities as a first identity, according to embodiments disclosed herein.

FIG. 12 is a flow chart illustrating an example of a method for a user performing activities as a first identity 1200, according to embodiments disclosed herein. After the start 1201, the user can create a first identity 802, store the first public key in association with the first pseudonym identifier 803 and perform activities while acting as the first identity 804 before the method stops 1202.

Figure 13:
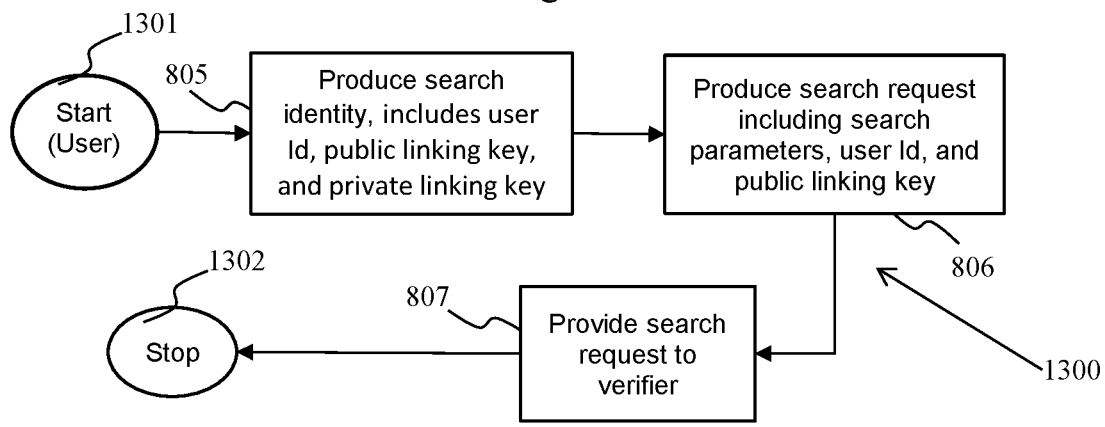
FIG. 13 is a flow chart illustrating an example of a user sending a search request to a verifier, according to embodiments disclosed herein.

FIG. 13 is a flow chart illustrating an example of a method for a user sending a search request to a verifier 1300, according to embodiments disclosed herein. After the start 1301 the user can produce a search identity 805 and then produce a search request 806. The search request can be sent to the verifier 807 before the method stops 1302.

Figure 14:
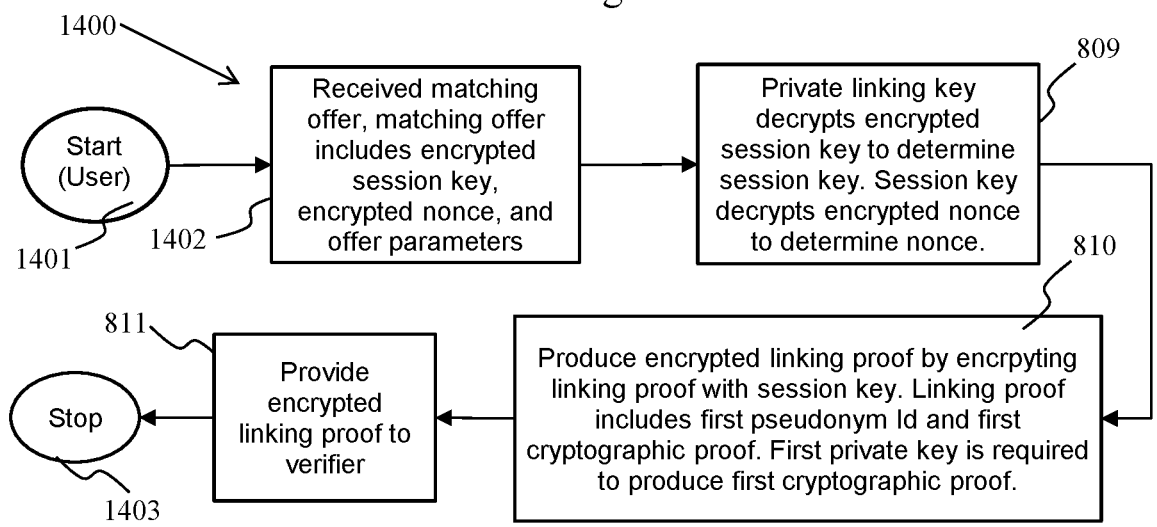
FIG. 14 is a flow chart illustrating an example of a user sending a linking proof to a verifier, according to embodiments disclosed herein.

FIG. 14 is a flow chart illustrating an example of a method for a user sending a linking proof to a verifier 1400, according to embodiments disclosed herein. After the start 1401, having received a matching offer 1402 the user can determine the session key and the nonce 809. The user can produce an encrypted linking proof 810 and provide the encrypted linking proof to the verifier 811 before the process stops 1403.

Figure 15:
FIG. 15 is a flow chart illustrating an example of a user receiving a reward, according to embodiments disclosed herein.

FIG. 15 is a flow chart illustrating an example of a method for a user receiving a reward 1500, according to embodiments disclosed herein. After the start 1501 and having received the reward 1502, the process stops 1503. Here, the user may not even be aware of having received the award. For example, if it is an award of cryptocurrency, blockchain tokens, or even a direct deposit of money to a bank account, the event occurs and is complete. The user may notice the reward and take advantage of it.

Figure 16:
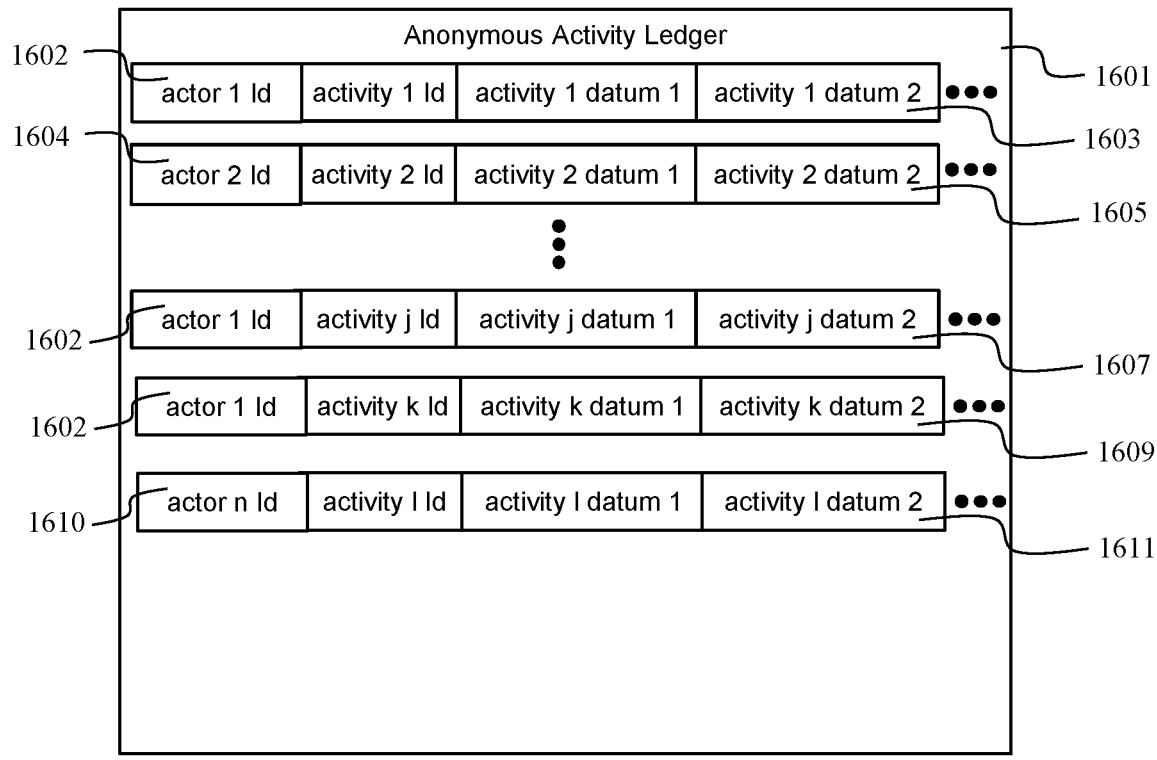
FIG. 16 is an example of activities stored in association with actor identifiers, according to embodiments disclosed herein.

FIG. 16 is an example of activities stored in association with actor identifiers, according to embodiments disclosed herein. An actor can perform an activity and data can be associated with the performance of the activity. An anonymous activity ledger can store activities in association with actor identifiers where the true identities of the actors are unknown. An example of such a non-anonymous activity ledger is a browsing history linked to an ad network's cookie. The ad network might not know whose browsing history it is until it manages to link that cookie to an actual person. Another example of a non-anonymous activity ledger is the purchase and payment histories maintained by credit bureaus. Note that the embodiments disclosed herein put the user in control of who knows various portions of their browsing history and other activities by using an anonymous activity ledger 1601.

The first actor, identified by actor 1 Id 1602 can perform various activities including activities 1603, 1607, and 1609. A second actor 1604 can perform various activities including activity 1605. An Nth actor 1610 can perform various activities including activity 1611. Whoever reads the anonymous activity ledger does not know which of those activities were performed by which person. A single person or three different people could be actors 1, 2, and n. Activities can have identifiers to indicate the type of activity such as bought something, internet search, internet browsing, went to a location, etc. The activity datums can provide the specifics as to what was bought, search string, browsed URL, location, etc.

Figure 17:
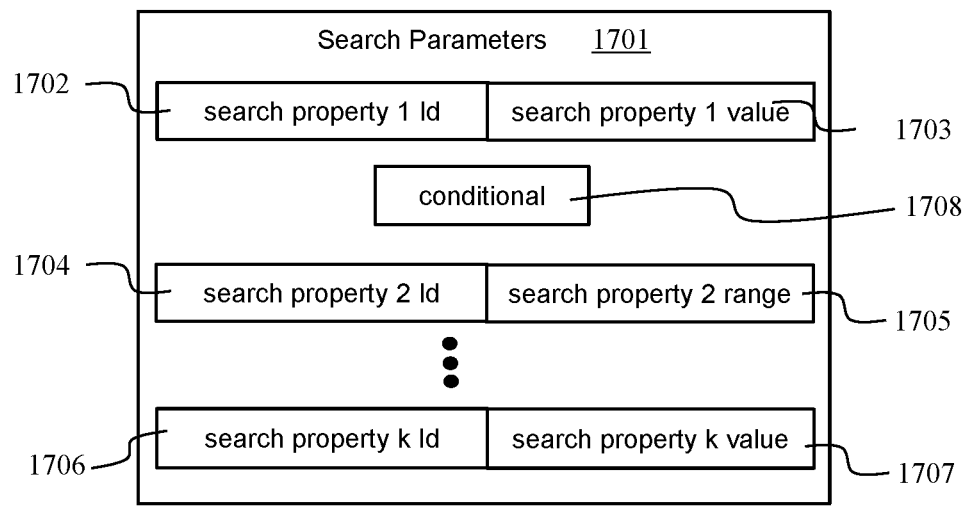
FIG. 17 is an example of search parameters, according to embodiments disclosed herein.

FIG. 17 is an example of search parameters 1701, according to embodiments disclosed herein. A search property identifier 1702, 1704, 1706 and the values 1703, 1707 and ranges 1705 can be used determine if an offer is of interest to a user. The conditional 1708 indicates that the parameters can be combined using Boolean logic such as AND, OR, NOT, etc. For example, a property could be a location and a range could distance from the location. A property could be the type of service with a value such as car repair. In such a case, the user could be looking for offers of car repair AND within a certain area.

Figure 18:
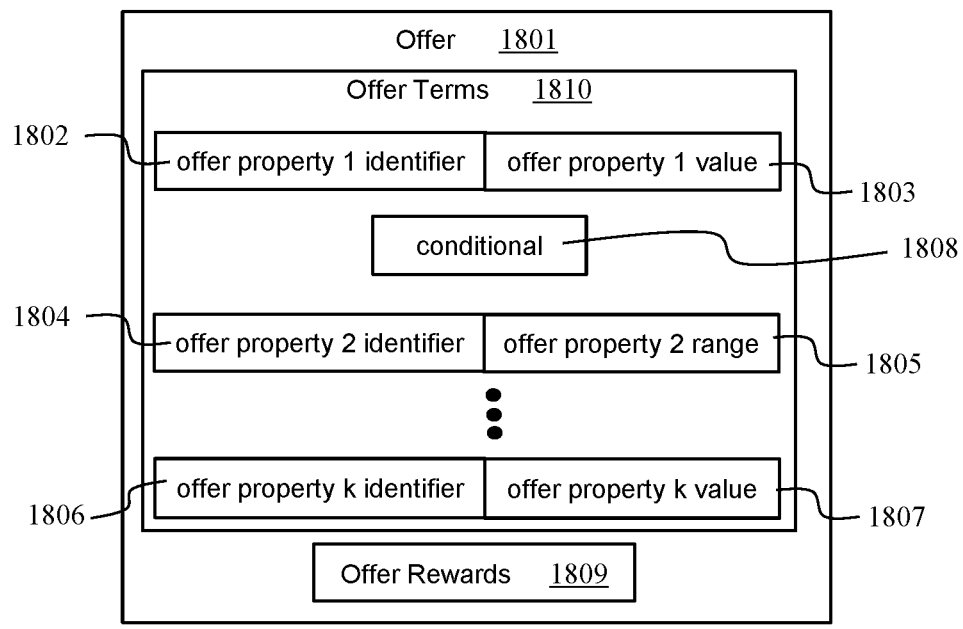
FIG. 18 is an example of an offer, according to embodiments disclosed herein.

FIG. 18 is an example of an offer 1801, according to embodiments disclosed herein. An offer property identifier 1802, 1804, 1806 and offer property values 1803 1807 and ranges 1805 can simply provide information regarding the offeror. Returning to the previous example, the property identifiers and values may specify services, goods, and the locations. Returning to the example above, a service could be car repair at a given location. In such a case, the offer could match the search discussed above. In addition, the offer property identifiers could match an activity id such as that used in the anonymous activity ledger 1601, could be a key within a datum (e.g. activity j datum 1 could be a key value pair), or both. The values 1803, 1807 and ranges 1805 can be used to determine if an activity matches an offer term or is within a range specified by an offer term. The conditional 1808 indicates that the terms can be combined using Boolean logic such as AND, OR, NOT, etc. An example can be an activity id indicating "bought a car" while key value datums can indicate the make, model, color, year etc. Note that the activity id can also be given is a key value pair with a key "activity Id". The offer terms parameters could be (((activity id=bought a car) and (car make=dodge) and (price <10000) and not (car new=true)) and (activity id=searching) and (search string include "repair")). The reward 1809 can be based on which of the terms or combination of terms are satisfied by the activities.

The method for selective linkability builds on the standard use of public/private key pairs and asymmetric encryption and signature algorithms in combination with the use of pseudonyms instead of real user identities. In BASE, users can perform different sets of transactions under different pseudonyms $ID_i$, each using a unique key pair (e.g., RSA), consisting of a public key $LK_i^+$ and private key $LK_i^-$, to be used for asymmetric encryption and digital signature algorithms. Each public key will be available to the general public, e.g., on the blockchain. Each pseudonym can be used to represent a user's "persona" or a unique pseudonym and can be used for each transaction.

Any entity in the system can challenge a user claiming to own pseudonyms $ID_i$ to prove that they hold the corresponding private key $LK_i^-$. One such method that a verifier V can engage in such a challenge is to issue two encrypted quantities: $Encr\{K_V\}LK_i^+$ (i.e., asymmetric encryption of a symmetric key $K_V$ with public key $LK_i^+$) and $Encr\{N_V\}K_V$ (i.e. symmetric encryption of a nonce $N_V$ with symmetric session key $K_V$). A user owning pseudonyms $ID_i$ and holding private key $LK_i^-$, can decrypt the first quantity to recover the symmetric session key $K_V$, subsequently decrypt the second quantity to recover the nonce $N_V$, and respond to the challenge with the signature: $Sign\{N_V\}LK_i^-$ (i.e., the nonce signed with the corresponding private key).

Suppose a user P (the prover) wants to prove to a business V (the verifier) that P was responsible for several past transactions (e.g., searches, offer views, purchases, sharing data, etc.) that were performed under different pseudonyms $ID_1, \ldots, ID_N$ in BASE (an intent that can be expressed by encrypting such a claim for the business V to read), without revealing the true identity P. P can make use of the challenge-response primitive above to prove knowledge of the credentials corresponding to these pseudonyms to V, while acting under yet another pseudonym $ID_0$. As such, the verifier V will issue the challenge:

[$Encr\{K_{V0}\}LK_0^+$, $Encr\{N_V\}K_{V0}$], and P can respond with the list of signatures corresponding to the various pseudonyms, encrypted or signed with the session key $K_{V0}$, which can be expressed as:

$Encr\{Sign\{N_V\}LK_1^-|Sign\{N_V\}LK_2^-|$ . . . $|Sign\{N_V\}LK_N^-\}K_{V0}$, This linking message is encrypted with the session key $K_V$ to ensure confidentiality of the signature and protect the knowledge that the pseudonyms $ID_1, \ldots, ID_N$ are all related to $ID_0$. Furthermore, signing based on a randomly generated nonce provided by the verifier will prevent replay attacks, as proving the same links between the same transactions would result in different signatures. As each transaction can be performed under a unique pseudonym and key pair, this provides complete pseudonymity between a customer's searches and offers.

Figure 19:
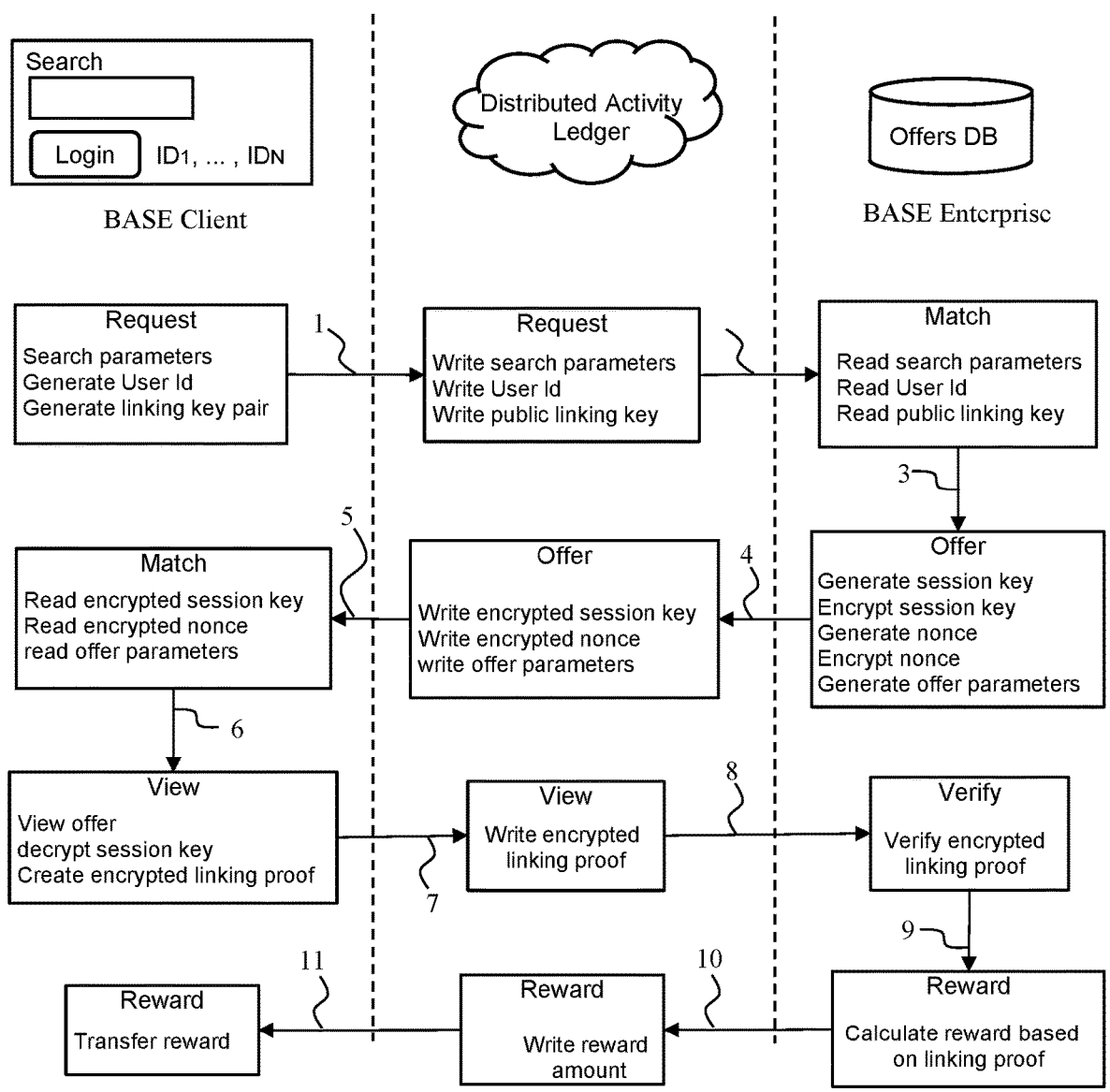
FIG. 19 illustrates a high-level view of an example of a data flow between main actors wishing to implement selective linkability, according to embodiments disclosed herein.

FIG. 19 illustrates a high-level view of an example of a data flow between main actors wishing to implement selective linkability, according to embodiments disclosed herein. The data flow can consist of the following steps (the step numbers correspond to the enumerated arrows in FIG. 19):

1. User logs into BASE client application using one of the pseudonym identities ($ID_0$) and enters a search query. In response, the client application generates a unique request identifier and unique linking key pair (private key $LK_i^-$ and public key $LK_i^+$). The search query, request id and public linking key are written to the decentralized activity ledger (e.g., blockchain).
2. The matching algorithm interprets the search query and passes it on to the BASE enterprise application, along with the request id and public linking key.
3. The BASE enterprise application creates a matching offer. It also generates a session key ($K_{V0}$) and a random nonce ($N_V$). The session key is encrypted with the public linking key, obtained at step 2. The nonce is encrypted with the session key.
4. The encrypted nonce, session key and offer parameters are written to the decentralized activity ledger.
5. The matching algorithm in the BASE client application reads the encrypted session key, the encrypted nonce and offer parameters. If offer is relevant it is presented to the user.
6. The BASE client application decrypts the session key with private linking key, generated at step 1, and decrypts the nonce using the session key. Then it proceeds to generate encrypted linking proof ($Encr\{Sign\{N_V\}LK_i^-|ID_i\}K_{V0}$) as in the selective linkability method above.
7. The encrypted linking proof is written to the distributed activity ledger.
8. The BASE enterprise application receives a notification that offer view parameters are available on the ledger. It reads encrypted linking proof and decrypts it using shared session key. The linking proof contains information that links multiple user's pseudonyms together and is used to link user's activities that may impact the reward amount.
9. Business determines the reward amount.
10. Reward amount is written to decentralized activity ledger.
11. Reward is transferred to the user.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware or any combination thereof. The above-described embodiments of the invention may also be implemented, for example, by operating a computer system to execute a sequence of machine-readable instructions. Typically, the computer readable instructions, when executed on one or more processors, implements a method. The instructions may reside in various types of computer readable media. In this respect, another aspect of the present invention concerns a programmed product, comprising a computer readable medium tangibly embodying a program of machine-readable instructions executable by a digital data processor to perform the method in accordance with an embodiment of the present invention. The computer readable media may comprise, for example, RAM (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method comprising:
   storing a plurality of offers comprising offer terms and offer rewards;
   receiving a search request from a user, the search request comprising search parameters, a user identifier, and a public linking key;
   matching an offer with the search request wherein the offer is within the search parameters, wherein the offer is one of the plurality of offers;
   providing a matching offer to the user, wherein the matching offer comprises an encrypted session key, an encrypted nonce, and offer parameters, wherein the encrypted session key is a session key encrypted by the public linking key, wherein the encrypted nonce is a nonce encrypted by the session key, and wherein the offer parameters are based on the offer;
   receiving an encrypted linking proof, wherein the encrypted linking proof is a linking proof encrypted by the session key, wherein the linking proof comprises a first pseudonym identifier and a first cryptographic proof proving that the user knows a first private key associated with the first pseudonym identifier;
   receiving a first public key, the first public key associated with the first pseudonym identifier;
   verifying the first cryptographic proof using the first public key; and
   linking the user to a plurality of activities, the plurality of activities comprising first pseudonym activities that are associated with the first pseudonym identifier.

2. The method of claim 1 further comprising:
   calculating a reward based on the plurality of activities; and
   providing the reward to the user.

3. The method of claim 1 wherein the first cryptographic proof comprises a first encrypted nonce, wherein the first public key decrypts the first encrypted nonce.

4. The method of claim 1 wherein the first cryptographic proof comprises a first digital signature of the nonce, and wherein the first public key verifies the first digital signature.

5. The method of claim 1 wherein the search request is received from a blockchain maintained by a plurality of network nodes.

6. The method of claim 1 wherein providing the matching offer to the user comprises storing the matching offer on a blockchain maintained by a plurality of network nodes.

7. The method of claim 1 wherein the linking proof is received from an open public decentralized storage or a blockchain maintained by a plurality of network nodes.

8. The method of claim 1 wherein the first public key is received from an open public decentralized storage or a blockchain maintained by a plurality of network nodes, wherein the first public key is stored on the open public decentralized storage or the blockchain in association with the first pseudonym identifier.

9. The method of claim 1 wherein the plurality of activities is stored on an open public decentralized storage or a blockchain in association with the first pseudonym identifier, and wherein the open public decentralized storage or the blockchain is maintained by a plurality of network nodes.

10. The method of claim 1:
    wherein the linking proof comprises a plurality of pseudonym identifiers in association with a plurality of cryptographic proofs, the plurality of cryptographic proofs proving that the user knows a plurality of private keys associated with the plurality of pseudonym identifiers;
    wherein a plurality of public keys associated with the plurality of pseudonym identifiers are received;
    wherein the plurality of cryptographic proofs is verified by using the plurality of public keys to verify the plurality of cryptographic proofs; and
    wherein the plurality of activities further comprises a plurality of additional activities associated with the plurality of pseudonym identifiers.

11. The method of claim 10 further comprising:
    calculating a reward based on the plurality of activities; and
    providing the reward to the user;
    wherein the search request is received from an open public decentralized storage or a blockchain maintained by a plurality of network nodes;
    wherein providing the matching offer to the user comprises storing the matching offer on the open public decentralized storage or the blockchain;
    wherein the linking proof is received from the open public decentralized storage or the blockchain;
    wherein the plurality of public keys is stored in association with the plurality of pseudonym identifiers on the open public decentralized storage or the blockchain;
    wherein the plurality of public keys is received from the open public decentralized storage or the blockchain; and
    wherein the plurality of activities is stored on the open public decentralized storage or the blockchain in association with the first pseudonym identifier.

12. The method of claim 11 further comprising:
    maintaining the open public decentralized storage or the blockchain on a network node;
    producing a first identity comprising the first pseudonym identifier, the first private key, and the first public key;
    performing the plurality of activities;
    producing a search identity comprising the user identifier, a private linking key, and the public linking key;
    producing the search request;
    storing the search request on the open public decentralized storage or the blockchain;
    receiving the matching offer from the open public decentralized storage or the blockchain;
    determining the session key using the private linking key;
    determining the nonce using the session key;
    producing the encrypted linking proof;
    storing the encrypted linking proof in the open public decentralized storage or the blockchain; and
    receiving the reward from the open public decentralized storage or the blockchain;
    wherein the first cryptographic proof comprises a first encrypted nonce, wherein the first public key decrypts the first encrypted nonce; and wherein a second cryptographic proof comprises a digital signature of the nonce, and wherein a second public key verifies the digital signature.

13. A method comprising:

producing a first identity comprising a first pseudonym identifier, a first private key, and a first public key wherein the first public key is made publicly available in association with the first pseudonym identifier;

performing a plurality of first pseudonym activities wherein the plurality of first pseudonym activities is publicly associated with the first pseudonym identifier;

producing a search identity comprising a user identifier, a private linking key, and a public linking key;

producing a search request comprising search parameters, the user identifier, and the public linking key;

providing the search request to a verifier;

receiving a matching offer from the verifier, the matching offer comprising an encrypted session key, an encrypted nonce, and offer parameters, wherein the encrypted session key is a session key encrypted by the public linking key, wherein the encrypted nonce is a nonce encrypted by the session key, and wherein the session key is a symmetric key;

determining the session key and the nonce;

producing an encrypted linking proof, wherein the encrypted linking proof is a linking proof encrypted by the session key, wherein the linking proof comprises the first pseudonym identifier and a first cryptographic proof proving knowing the first private key;

providing the encrypted linking proof to the verifier; and receiving a reward based on the matching offer and the plurality of first pseudonym activities.

14. The method of claim 13:

wherein the first public key is made publicly available by being stored in association with the first pseudonym identifier on an open public decentralized storage or a blockchain maintained by a plurality of network nodes;

wherein the plurality of first pseudonym activities is publicly associated with the first pseudonym identifier by being stored in association with the first pseudonym identifier on the open public decentralized storage or the blockchain;

wherein providing the search request to the verifier comprises storing the search request on the open public decentralized storage or the blockchain;

wherein the matching offer is received from the open public decentralized storage or the blockchain;

wherein providing the encrypted linking proof to the verifier comprises storing the encrypted linking proof on the open public decentralized storage or the blockchain; and wherein the reward is received from the open public decentralized storage or the blockchain.

15. A non-transitory computer readable medium storing computer readable instructions, that when executed on one or more processors, implements a method comprising:

storing a plurality of offers comprising offer terms and offer rewards;

receiving a search request from a user, the search request comprising search parameters, a user identifier, and a public linking key;

matching an offer with the search request wherein the offer is within the search parameters, wherein the offer is one of the plurality of offers;

providing a matching offer to the user, wherein the matching offer comprises an encrypted session key, an encrypted nonce, and offer parameters, wherein the encrypted session key is a session key encrypted by the public linking key, wherein the encrypted nonce is a nonce encrypted by the session key, and wherein the offer parameters are based on the offer;

receiving an encrypted linking proof, wherein the encrypted linking proof is a linking proof encrypted by the session key, wherein the linking proof comprises a first pseudonym identifier and a first cryptographic proof proving that the user knows a first private key associated with the first pseudonym identifier;

receiving a first public key, the first public key associated with the first pseudonym identifier;

verifying the first cryptographic proof using the first public key; and linking the user to a plurality of activities, the plurality of activities comprising first pseudonym activities that are associated with the first pseudonym identifier.

16. The non-transitory computer readable medium storing computer readable instructions of claim 15, the method further comprising:

calculating a reward based on the plurality of activities; and providing the reward to the user.

17. The non-transitory computer readable medium storing computer readable instructions of claim 15 wherein the first cryptographic proof comprises a first encrypted nonce, wherein the first public key decrypts the first encrypted nonce.

18. The non-transitory computer readable medium storing computer readable instructions of claim 15 wherein the first cryptographic proof comprises a first digital signature of the nonce, and wherein the first public key verifies the first digital signature.

19. The non-transitory computer readable medium storing computer readable instructions of claim 15:

wherein the linking proof comprises a plurality of pseudonym identifiers in association with a plurality of cryptographic proofs, the plurality of cryptographic proofs proving that the user knows a plurality of private keys associated with the plurality of pseudonym identifiers;

wherein a plurality of public keys associated with the plurality of pseudonym identifiers are received;

wherein the plurality of cryptographic proofs is verified by using the plurality of public keys to verify the plurality of cryptographic proofs; and wherein the plurality of activities further comprises a plurality of additional activities associated with the plurality of pseudonym identifiers.

20. The non-transitory computer readable medium storing computer readable instructions of claim 19, the method further comprising:

maintaining an open public decentralized storage or a blockchain on a network node wherein the open public decentralized storage or the blockchain is maintained by a plurality of network nodes;

wherein the search request is received from the open public decentralized storage or the blockchain;

wherein providing the matching offer to the user comprises storing the matching offer on the open public decentralized storage or the blockchain;

wherein the linking proof is received from the open public decentralized storage or the blockchain;

wherein the plurality of public keys is stored in association with the plurality of pseudonym identifiers on the open public decentralized storage or the blockchain;

wherein the plurality of public keys is received from the open public decentralized storage or the blockchain; and wherein the plurality of activities is stored on the open public decentralized storage or the blockchain in association with the first pseudonym identifier.

\* \* \* \* \*